US008271822B2

(12) United States Patent
Fong et al.

(10) Patent No.: US 8,271,822 B2
(45) Date of Patent: *Sep. 18, 2012

(54) INTERACTIVE DEVICE WITH TIME SYNCHRONIZATION CAPABILITY

(75) Inventors: Peter Sui Lun Fong, Monterey Park, CA (US); Kelvin Yat-Kit Fong, Monterey Park, CA (US); Chun Yan Liu, Shenzhen (CN)

(73) Assignee: Peter Sui Lun Fong, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,138

(22) Filed: Sep. 20, 2011

(65) Prior Publication Data

US 2012/0030498 A1 Feb. 2, 2012

Related U.S. Application Data

(63) Continuation of application No. 12/023,783, filed on Jan. 31, 2008, now Pat. No. 8,046,620.

(51) Int. Cl.
*G06F 1/12* (2006.01)

(52) U.S. Cl. ......................... 713/400; 446/297; 446/484

(58) Field of Classification Search .................. 713/400; 446/297, 484
See application file for complete search history.

(56) References Cited

U.S. PATENT DOCUMENTS 5,752,880 A * 5/1998 Gabai et al. ...................... 463/1
6,554,679 B1 4/2003 Shackelford et al.
7,068,941 B2 * 6/2006 Fong et al. .................... 398/107
8,046,620 B2 * 10/2011 Fong et al. .................... 713/400
2003/0129922 A1 7/2003 Curran
2004/0038620 A1 2/2004 Small
2004/0117858 A1 6/2004 Boudreau et al.
2005/0226201 A1 10/2005 McMillin
2006/0217967 A1 9/2006 Goertzen
2007/0087791 A1 4/2007 Feeney et al.
2007/0128979 A1 6/2007 Shackelford et al.

* cited by examiner

*Primary Examiner* — Chun Cao
(74) *Attorney, Agent, or Firm* — Stetina Brunda Garred & Brucker

(57) ABSTRACT

An interactive device having time synchronization capability is provided. In one embodiment, the interactive device has a computer processor that stores an internal clock. The computer processor may be preprogrammed to generate announcements based on a particular time of the internal clock. A user may input and adjust the time of the internal clock. In another embodiment, a setup module is provided which includes a computer processor that stores a setup time. The setup module establishes a connection with an interactive device, and time synchronizes the interactive device such that the internal clock of the interactive device is running the same time as the setup module. The setup module is capable of synchronizing the internal clock of multiple interactive devices, despite the interactive devices being programmed on separate occasions. The interactive device may be synchronized by the setup module via a hard-wired connection or wireless means.

23 Claims, 13 Drawing Sheets

INTERACTIVE DEVICE WITH TIME SYNCHRONIZATION CAPABILITY

CROSS-REFERENCE TO RELATED APPLICATIONS

The present application is a continuation application of U.S. application Ser. No. 12/023,783 entitled INTERACTIVE DEVICE WITH TIME SYNCHRONIZATION CAPABILITY filed Jan. 31, 2008 now U.S. Pat. No 8,046, 620.

STATEMENT RE: FEDERALLY SPONSORED RESEARCH/DEVELOPMENT

Not Applicable

BACKGROUND OF THE INVENTION

1. Field of the Invention

The present invention relates to an interactive device with time synchronization capabilities, and more particularly to an apparatus, system, and method for programming interactive devices such that internal clocks of the interactive device are time synchronized despite such devices being simultaneously programmed at a point of origin.

2. Description of the Related Art

Children are often attracted to interactive toys that provide both visual and audio stimulation. As a result, there are a number of articulated and animated toys capable of interacting with children in ways which appear intelligent which are well known in the art and commercially available under such trademarks as Furby® from Tiger Electronics, Ltd., and Barney® from MicroSoft, Inc. These toys are capable of understanding speech, speaking in a natural language and demonstrating limited animation such as mouth, eye and ear, movements.

Market demands compel creative manufactures to take traditional, mechanical toys and educational materials and transform them into interactive electronic devices. As expected, such interactive devices appeal to consumers more than their traditional counterparts. However, certain interactive devices require an exhaustive setup that may dissuade consumers from purchasing them. Therefore, oftentimes such interactive devices come preprogrammed by the manufacturer to relieve the user of the burden of a tedious setup.

Manufacturers are continuously attempting to implement procedures in an effort to streamline the production of such interactive devices. A setup computer or system is often used for streamlining production. The process promotes a quick and efficient manner to program the devices. This is especially advantageous when the manufacturer has a large number of devices in production. However, certain interactive devices may require a more exhaustive setup than other devices. For those devices which include calendar and clock functionality, the known prior art is currently lacking a quick, efficient, and cost effective protocol which may be implemented by the manufacturer to allow such devices to be time synchronized at the point of origin, such that each device's internal clock reads the same time which corresponds to an ultimate shipment destination for such devices.

One of the advantages of having time synchronized devices, is that each device may generate a triggered response at the same time. Such devices may be more marketable to consumers when viewed upon a retailer's shelf generating audio and visual messages in concert. Another one of the advantages of having time synchronized devices is that the ultimate purchaser of such device may be excused from the burden of having to undertake a time consuming, difficult programming task as would otherwise be needed to cause the device to function in the desired manner. A particular interactive device that may benefit from time synchronization at the point of manufacture is a customizable calendar. An example of a customizable calendar is an Advent calendar. An Advent calendar is a popular holiday calendar that counts down the days to Christmas. The traditional Advent calendar, as illustrated in FIG. 1, consists of two pieces of cardboard on top of each other where twenty-four doors are cut out in the top layer creating specific compartments, with one compartment door being opened every day from December 1 to December 24 (Christmas Eve). Each compartment can either show a part of the Nativity story, or can simply display a piece of paraphernalia having to do with Christmas (e.g. Bells, holly).

An electronic adaptation embedding the functionality of an Advent calendar 1 into an interactive device requires the device (i.e., the interactive Advent device) to generate a response indicative of when to open a particular compartment door based upon date and time. In this regard, the interactive Advent device must be programmed relative to the calendar and clock parameters of a traditional Advent calendar in that it must have an internal calendar and clock which is capable of counting down the days to Christmas. Furthermore, the functionality of the interactive Advent device must generate an instruction or an alarm, at a set time, instructing the user take action relative to the opening a box in a traditional Advent calendar. Therefore, for the reasons discussed above, it would be advantageous for each interactive Advent device to be time synchronized at the point of manufacture such that the devices run precisely the same date and time corresponding to their ultimate shipment destination. Having a global marketplace allows products like an interactive Advent device to be manufactured, marketed, and sold all over the world; therefore various local customs, such as daylight savings, must also be incorporated into the program. Consequently, the programming of such devices is made difficult as a result of mass production and would require a great deal of manpower and associated costs to individually program each device such that they are time synchronized in a prescribed manner.

Therefore, there is currently a need in the art for an apparatus, method, and system for streamlining the time synchronization capability of an interactive device, such as an interactive Advent device, such that it is efficient, low cost, and versatile to adapt to customized parameters.

BRIEF SUMMARY OF THE INVENTION

In accordance with the present invention, there is provided multiple embodiments of an apparatus, system, and method, for the time synchronization of an interactive device. In a basic embodiment of the present invention, the system includes an interactive device and a setup module. An interactive device is a programmable device that comprises a computer processor, an internal battery, a connection means and an input and output means. The computer processor may be preprogrammed with an internal clock that is customizable to generate announcements on a particular day and time. In one particular embodiment of the present invention, the user may program the interactive device via an input means. The input means may be various buttons or the like that are fashioned upon the interactive device. In this regard, the user may set, adjust, or alter the functionality of the interactive device.

In another embodiment of the present invention, a manufacturer may utilize a setup module to preprogram the interactive device. A setup module is an operative device that includes a computer processor, a power means (e.g., a battery compartment for the installation of batteries or a DC power jack/socket for use with an AC/DC adapter), a connection means, a display screen, an input means and an output means. The setup module establishes a connection with an interactive device, and subsequently programs the internal clock of interactive device with various parameters to implement a prescribed functionality.

In addition, the setup module may time synchronize the interactive devices such that the internal clock of each interactive device is running the same time. The setup module is capable of synchronizing the internal clock of the interactive devices, despite the interactive devices being programmed on separate occasions. In addition, the setup module is capable of programming a number of interactive devices in a quick and efficient manner, thereby keeping the manufacturer's costs low.

In another embodiment of the present invention, the setup module may test the interactive device to ensure that the parameters stored in the interactive device is in accordance with the policies set forth by the manufacturer. If an interactive device is not properly configured, the setup module may trigger an alarm, which identifies the device, and reveals its deficiency.

Further in accordance with the present invention, there is provided a method for utilizing a setup module to establish a connection with an interactive device, and subsequently programming the interactive device with desired values and parameter. The method continues with the setup module programming the interactive device such that it is time synchronized with other interactive devices.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
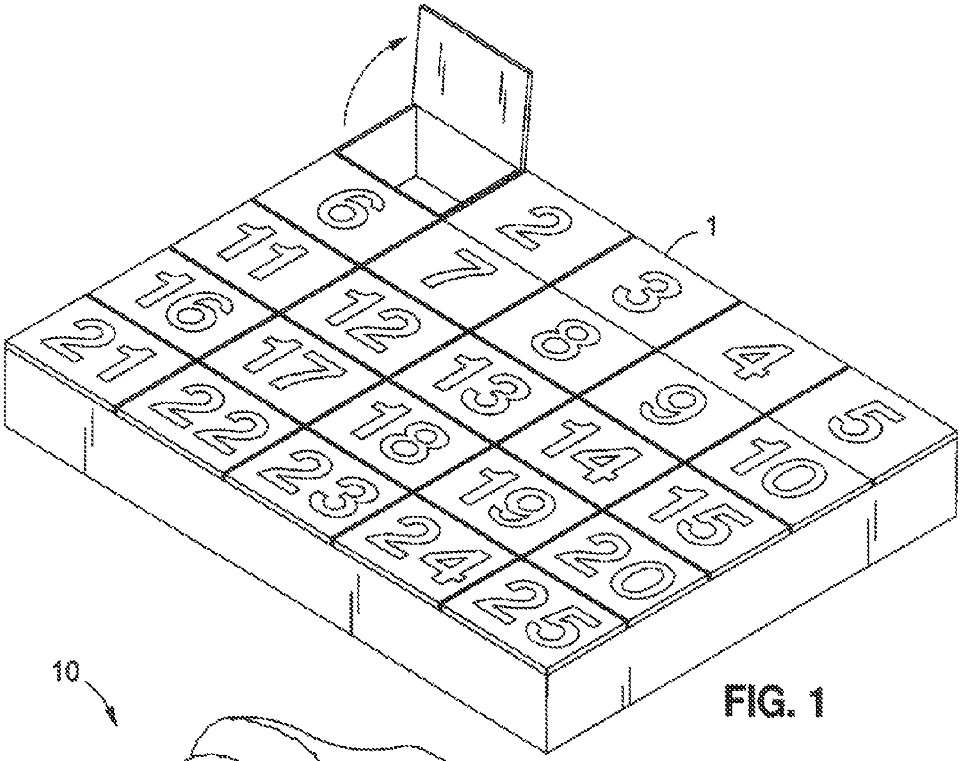
FIG. 1 depicts a traditional Advent calendar that is used in conjunction with an embodiment of the present invention to count down the days to Christmas.
Figure 2:
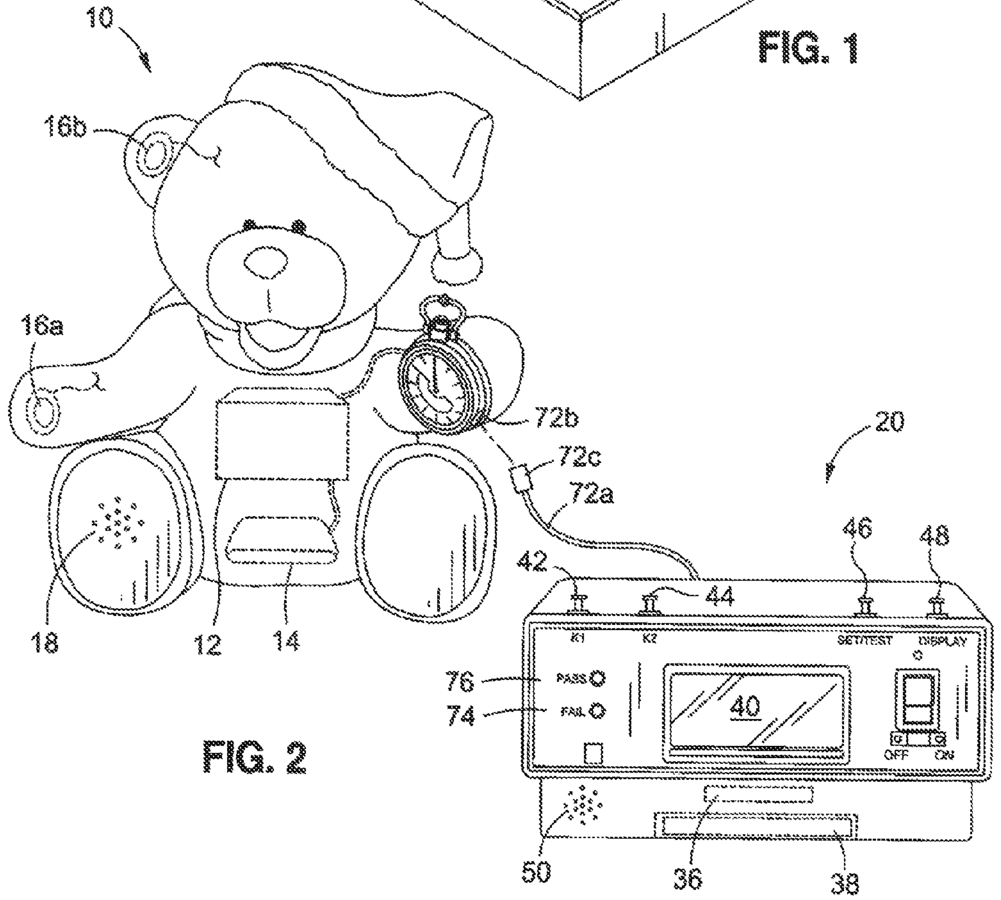
FIG. 2 depicts one embodiment of the interactive device of the present invention wherein the interactive device is fashioned as a teddy bear and a setup module of the present invention is provided in a stand alone configuration.

Referring now to the drawings wherein the showings are for purposes of illustrating various embodiments of the present invention only, and not for purposes of limiting the same, FIG. 2 depicts an interactive device 10 and a setup module 20 constructed in accordance with the present invention. The interactive device 10 is a programmable device that comprises a computer processor 12, an internal battery 14, an input means and an output means. In the present embodiment, the interactive device 10 is fashioned as common children's toy, a teddy bear. The teddy bear is adorned with seasonal attributes, such as the stocking cap. Such aesthetics are rendered for marketability of the product. A person having ordinary skill in the art would recognize that the interactive device 10 may be fashioned into a variety of home or office decorative items, lighting products such as Christmas light sets, a decorative display or device, seasonal decorative products such as ornaments, baby products, or children's toys, such as crib toys, a doll, a plastic or fabric figure, a plastic or fabric toy animal, a robot, a vehicle, an electronic game, a play set, or the like, and that the depiction of the teddy bear in FIG. 2 is exemplary only.

In the present embodiment, the computer processor 12 is programmable to run a software program which includes a clock calendar program, a daylight savings program, and a daily alarm and announcement program. A person having ordinary skill in the art would recognize that a computer processor 12 being versatile in scope is capable of running a multitude of programs with varying functionality. Software run on the computer processor 12 is generally directed towards specific attributes the interactive device 10 possesses. The current embodiment of the present invention carries the functionality of an Advent calendar like the above-described Advent calendar 1. In this regard, the programming carries the requisite logic to employ an Advent calendar 1. It is not the intention of the interactive device 10 to replace an Advent calendar 1, but rather to complement it. More specifically, the interactive device 10 is programmed to countdown the days to Christmas, and accordingly provides instructions as to when to open the appropriate correlated box upon the Advent calendar 1.

Figure 3:
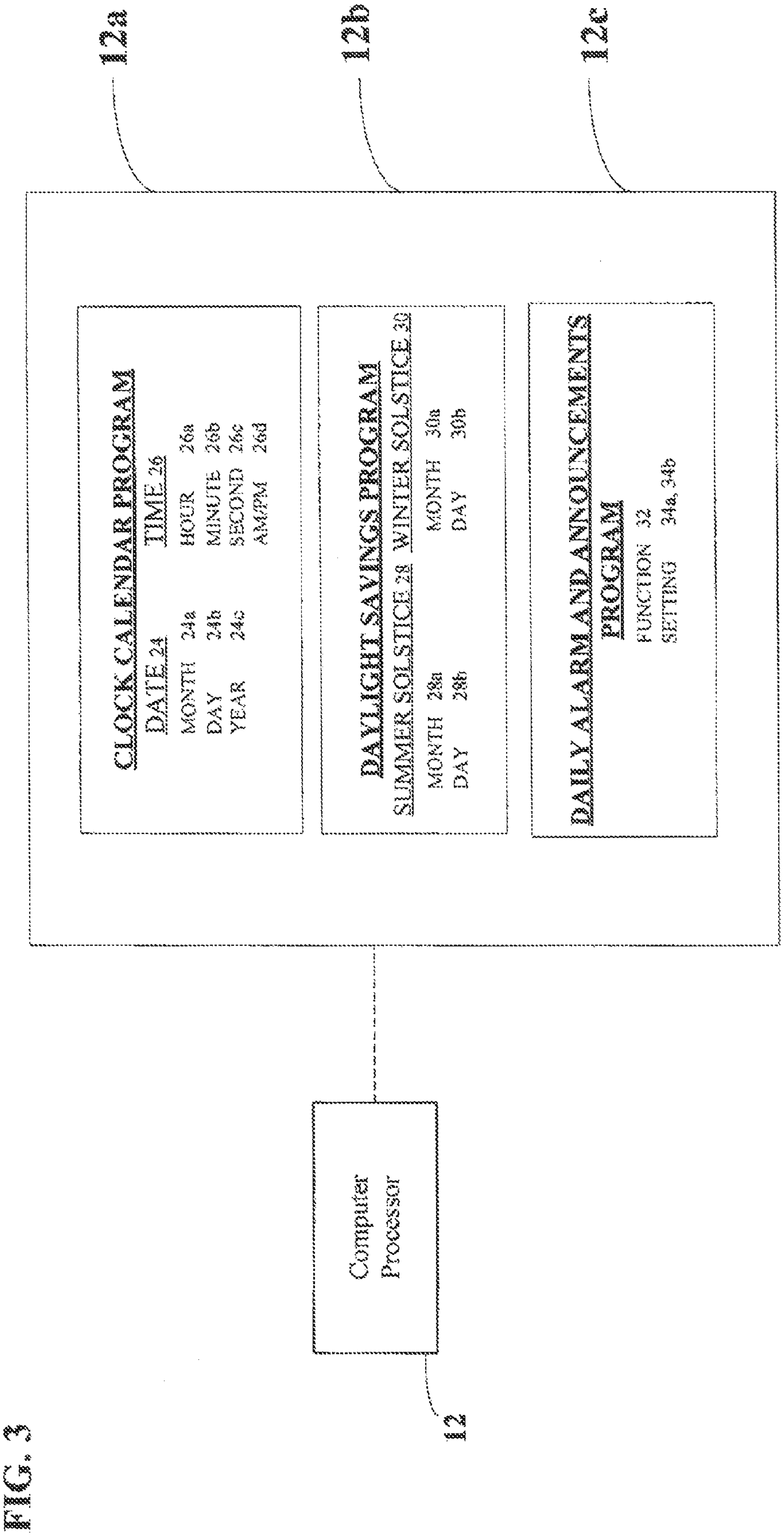
FIG. 3 depicts a software architecture block diagram, representing the data structures of each program run in an interactive device.

The software architecture block diagram in FIG. 3 illustrates how the programs collectively work to provide the functionality of the Advent calendar 1. The computer processor 12 invokes each of the programs 12*a*-12*c* in the appropriate order. The calendar clock program 12*a* generally will be the first program invoked. Its function is to serve as the internal clock of the interactive device 10. More specifically, the clock calendar program 12*a* will set, keep and display the time of day and date of the interactive device 10. The clock calendar program 12*a* carries out the functions of a traditional clock and calendar, in that it records date and time and is adjustable.

Next, the daylight savings program 12*b* is invoked. The daylight savings program takes into account daylight savings, a time-related phenomenon that is observed in some parts of the world. In this regard, the daylight savings program 12*b* takes into account the summer and winter solstice dates, upon the arrival of which the time of day is adjusted by one hour either forward or backward, respectively. The observance of daylight savings is not recognized worldwide; therefore the functionality may be disabled if inapplicable to a particular locale. If the winter and summer solstice dates are programmed, the clock calendar program 12*a* automatically adjusts itself accordingly based upon those appropriate dates.

Finally, the daily alarm and announcement program 12*c* is invoked. The daily alarm and announcement program 12*c* allows a user to specify an occasion on which to trigger an alarm or announcement. Events, such as birthdays, holidays, local seasons, religious holidays and events, and the like, may be programmed into the daily alarm and announcement program 12*c*. In the present embodiment, the daily alarm and announcement program 12*c* stores the relevant dates counting down the days to Christmas. Each alarm and announcement stored in the daily alarm and announcement program 12*c* is triggered when the clock calendar program 12*a* hits that target date or time. For example, if the daily alarm and announcement program 12*c* has a stored alarm for December 1 at 10:00 AM, upon the clock calendar program 12*a* reaching December 1 and 10:00 AM, the daily alarm and announcement program 12*c* generates, "Today is December 1, there are 24 days to Christmas, Open the first box of your Advent Calendar."

Referring back to FIG. 2, the interactive device 10 may be programmed or adjusted ad hoc by the user, or come preprogrammed by the manufacturer. The user may program the interactive device 10 by utilizing the input means to set the values of the clock calendar program 12*a* the daylight savings program 12*b*, and the daily alarm and announcement program 12*c*. In the present embodiment, the computer processor 12, internal battery 14, input means and output means are seamlessly integrated within the interactive device 10. The requisite functional components of the interactive device 10 are designed to be minimally obstructive. A person having ordinary skill in the art would understand that the functional components of the interactive device 10 may be positioned in a variety of formats, so long as they do not disparage the creative appeal of the interactive device 10.

Figure 4:
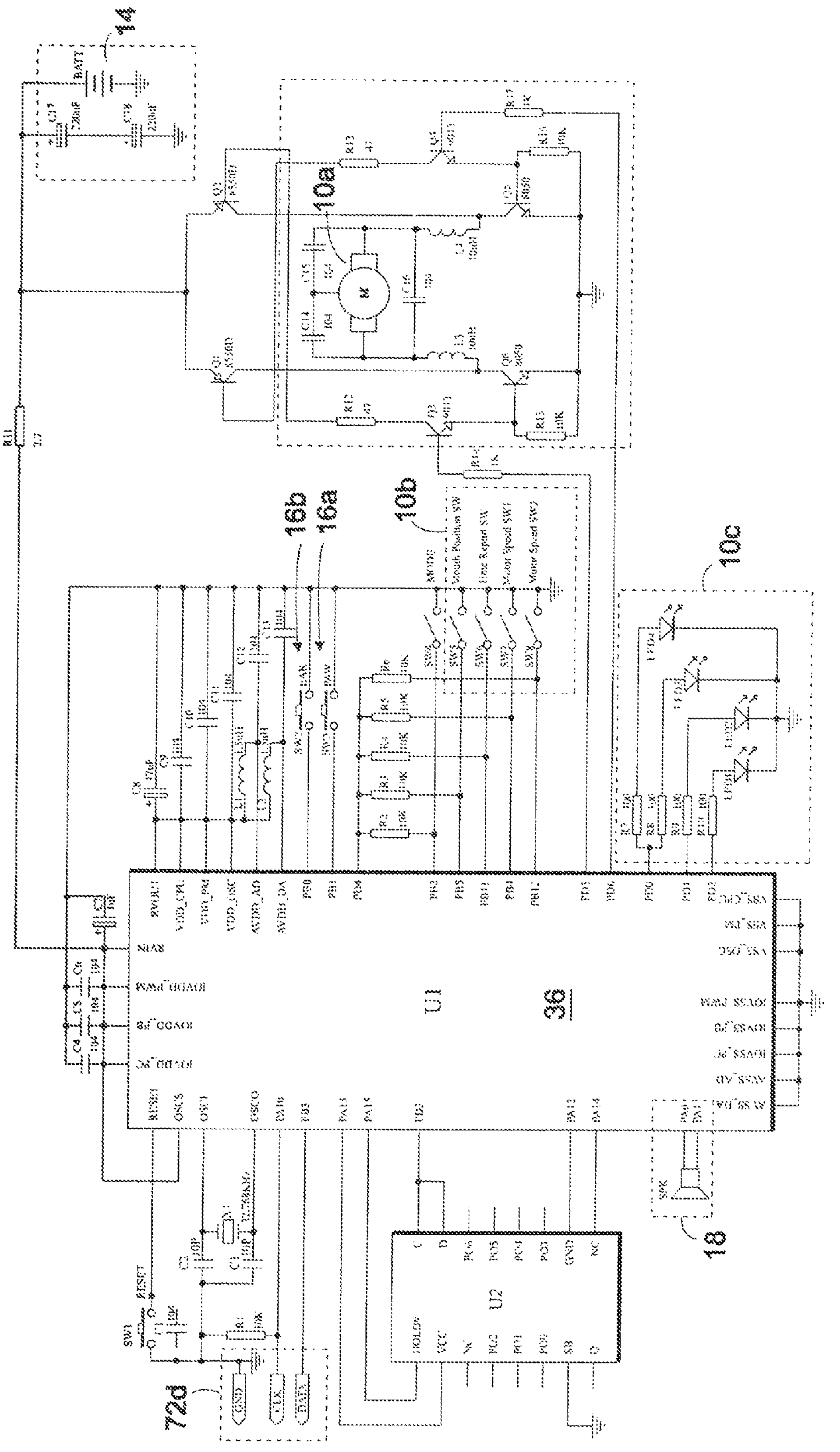
FIG. 4 depicts the electrical schematics of an embodiment of an interactive device, wherein the interactive device, fashioned as a teddy bear in an exemplary manner, is further equipped with a motor and a series of actuators providing the device the capability to mimic human action.

In the interactive device 10, the input means may comprise buttons or switches 16*a*, 16*b* strategically positioned in the paw and ear of the toy and the output means is an internal speaker 18. The input switches 16*a*, 16*b* are used for the input of values and the activation of programs 12*a*-12*c* in the interactive device 10, as will be discussed in more detail below. The interactive device 10 also includes a three position switch (not shown) located at the compartment for the internal battery 14, such switch being used to turn the interactive device 10 on and off and also to optionally place the interactive device 10 into either a "try-me" mode or a "play" mode. The output means may be an internal speaker 18, which generates audible messages to the user. FIG. 4 illustrates the schematics of the interactive device 10. The input switches 16*a*, 16*b* (corresponding to respective ones of SW3 and SW2) are used for the input of values and for the activation of programs 12*a*-12*c*, as indicated above.

Figure 5:
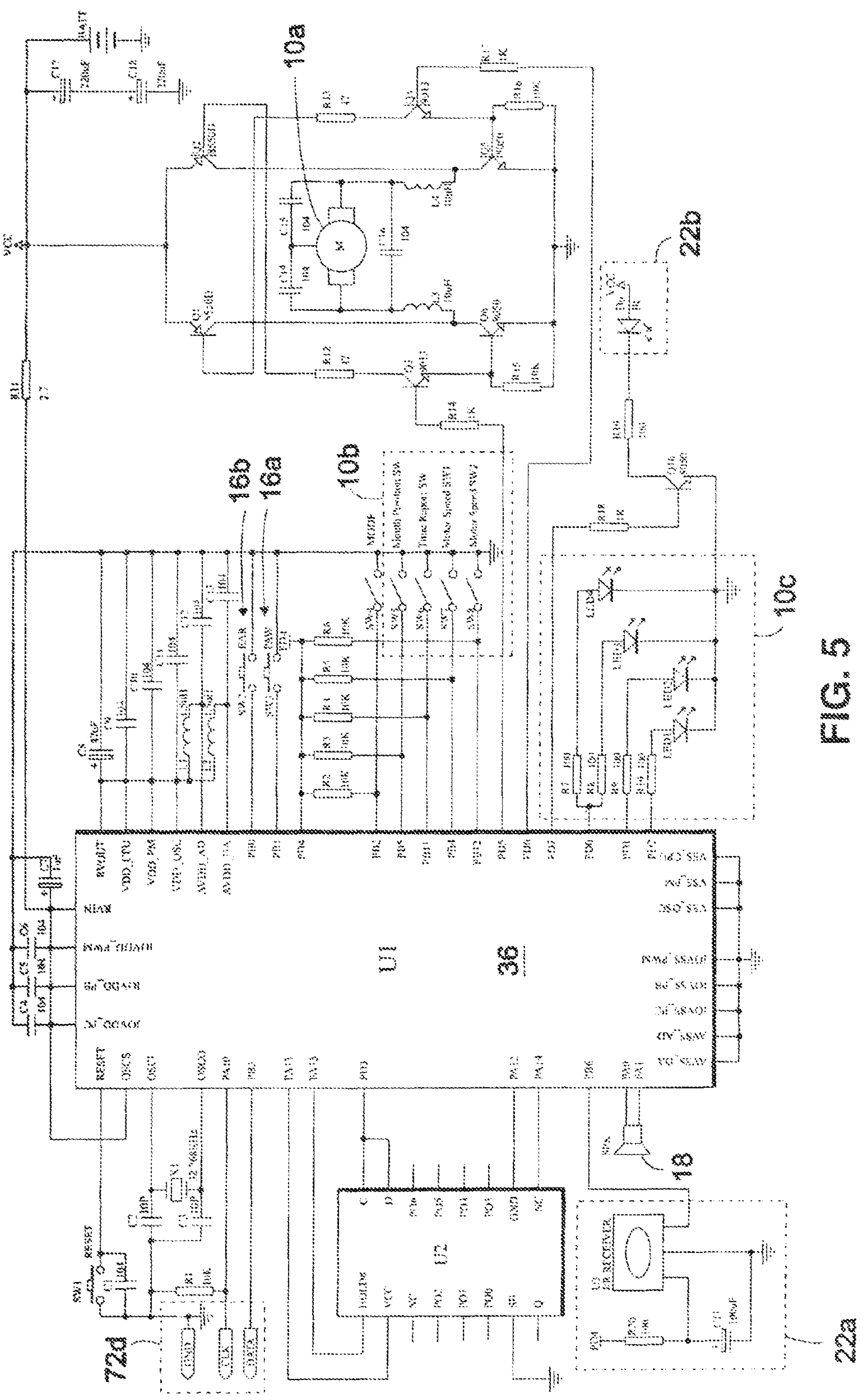
FIG. 5 depicts the electrical schematics of an exemplary embodiment of an interactive device, wherein the interactive device is equipped with an infrared receiver from which to receive data.

An exemplary embodiment of the present invention may exploit wireless technology as an input means. In this regard, FIG. 5 depicts the schematics of an alternative exemplary embodiment of the interactive device 10 utilizing an infrared receiver 22*a* as an input means. It is contemplated that a person having ordinary skill in the art would understand that, in this particular embodiment, a user may input values into an interactive device 10 by operating a device which has infrared transmission capability. It is also contemplated that in this alternative embodiment, the interactive device 10 may be provided with and infrared transmitter 22*b* that allows the interactive device 10 to transmit data to another device, the combined functionality of the receiver 22*a* and transmitter 22*b* being in accordance with the teachings of U.S. Pat. No. 7,068,941 entitled Interactive Talking Dolls, the disclosure of which is incorporated herein by reference. In addition, in either embodiment the output means may be an audio or visual display, such as a display screen or the like. The input and output means are likely to vary in accordance with the design and functionality of the interactive device 10. In the present embodiment, in order to conform to the overall aesthetic design of the interactive device 10 it is advantageous to design the switches 16*a*, 16*b* and the internal speaker 18 to conform to the design of the teddy bear. Moreover, it is also contemplated that in accordance with a further alternative embodiment of the present invention, the interactive device 10 may be outfitted with a transmitter and receiver which allow for the transmission, reception and synchronization of data information through the use of radio frequency (RF) rather than through the use of infrared as occurs through the use of the infrared receiver 22*a* and the infrared transmitter 22*b*.

The user enters desired values into the programs 12*a*-12*c* by manipulating the input switches 16*a*, 16*b*. Accordingly, the internal speaker 18 emits correlating audible message that indicate the value the user has toggled through or selected. FIG. 3 depicts the data structure of the programs 12*a*-12*c* of the computer processor 12. The clock calendar program 12*a* generally comprises date 24 and time 26 fields. The date 24 and time 26 serve as the internal clock and calendar of the interactive device 10 and are adjustable at anytime. The clock calendar program 12*a* is preprogrammed to default to "January" in the month field 24*a*. Therefore, when setting the month, the internal speaker 18 generates the word "January" to indicate the value that is currently selected in that field 24*a*. The user may increment the month by pushing the 'ear' switch 16*b* and upon reaching the desired month, the user may set the month by pushing the 'paw' switch 16*a*. The day field 24*b* defaults to the first day of the month "01", and accordingly, the program generates a "one" via the internal speaker 18. The user may increment the value in the day field 24*b* by pushing the ear switch 16*b* and subsequently set the day by pushing the paw switch 16*a*. The year field is preprogrammed to default to the present year. By utilizing the input buttons 16*a*, 16*b* the user may toggle to and set the desired year.

The time fields 26 are set in a similar manner as the date fields 24. The time 26 is set to hour 26*a*, minute 26*b*, second 26*c* and AM/PM 26*d*. The user may adjust the date 24 or time 26 at anytime by toggling the input switches 16*a*, 16*b*. The user may set or enter the interactive device 10 into a "sleep" mode or power conservation mode, and yet still retain the values set in programs 12*a*-12*c*. The interactive device 10 may also automatically enter itself into the "sleep" mode or power conservation mode if it is not being activated or used for a certain period of time, and yet still retain the values set in programs 12*a*-12*c*.

The daylight savings program 12*b* generally comprises a data structure that stores a summer solstice date 28 and a winter solstice date 30. The user may input values in the daylight savings program 12*b* by setting the date fields 28, 30 of the summer and winter solstices. The dates 28, 30 are set in a similar manner, as was the date in the clock calendar program 12*a* by manipulating the input switches 16*a* and 16*b*. Since daylight savings is not observed universally, the user may turn this functionality off if so desired. Selecting "NO" in the month fields 28*a*, 30*a* and the day fields 28*b*, 30*b* disables the daylight savings functionality. In this regard, the daylight savings program 12*b* can come preprogrammed to default a particular month or day. However, the user may populate the fields to adjust the dates for different parts or areas of the world.

The daily alarm and announcement program 12*c* generally comprises a data structure that stores a function field 32 and setting fields 34*a*, 34*b*. The function field 32 stores particular alarms or announcements indicative of an event. The setting fields 34*a*, 34*b* store the date and time the function field 32 is activated. The function field 32 is not open to being adjusted or altered. However, manipulating the setting fields 34*a*, 34*b* may disable the functionality stored within the function field 32. In the present embodiment, the daily alarm and announcement program 12*c* comes preprogrammed with the functionality and correlating library of sounds relative to an Advent calendar such as the exemplary Advent calendar 1. Once the clock calendar program 12*a* has reached an anticipated date 34*a* and time 34*b* as prescribed by the daily alarm and announcement program 12*c*, the program will initiate the play of specific messages 32. In this regard, the interactive device 10 will speak or broadcast messages to communicate the anticipation of the holiday event at whatever time the daily alarm and announcement program 12*c* calls for. For example, upon each day of December between December 1 and December 25, a response is generated from the daily alarm and announcement program counting down the days to Christmas, December 25. A person having ordinary skill in the art would understand that the daily alarm and announcements program 12*c* is capable of being programmed with a variety of functions 32 in anticipation of upcoming holidays or events. It is contemplated that in another embodiment of the present invention, functions 32 may be inputted to the interactive device 10 through software or by downloading content via the Internet. The manufacturer or third parties may provide functions 32 to store within the daily alarm and announcement program 12*c* on a fee basis or through software updates.

Referring back to FIG. 4, the interactive device 10 is strategically fitted with a motor 10*a* and a series of switches 10*b* and actuators that enable the interactive device 10 to mimic human action by moving its arms and legs, turning its head, opening its mouth, and flashing lights 10*c* in response to the daily alarm and announcement program 12*c*. The switches 10*b* are generally factory settable (or selectable). The physical actions of the interactive device 10 are specific such that they are activated according to a particular event. The internal speaker 18 emits messages while the mouth is moving, thereby giving the appearance that the interactive device 10 is directly speaking messages to the user. Consumers are generally drawn towards toys that mimic human actions. Therefore, the creativity of the interactive device 10 enhances the marketable appeal of the toy. Along these lines, retailers may find it advantageous to place interactive devices 10 upon the same shelf such that they generate a response in unison. The appearance of numerous interactive devices 10 simultaneously generating visual and audio stimulation further lends to marketable appeal. It should be noted that the switch SW6 shown in FIGS. 4 and 5 is a selection switch only needed by the manufacturer of the interactive device 10, such switch SW6 normally being open and optionally used by the manufacturer to assess the accuracy of the internal clock of the interactive device 10.

In another embodiment of the present invention, multiple interactive devices 10 may come preprogrammed and time synchronized by the manufacturer such that the clock and calendar program 12*a* of each interactive device 10 may run at exactly the same date 24 and the same time 26. This results in the interactive devices 10 being capable of generating responses in unison. The manufacturer programs the interactive device 10 by utilizing a setup module 20, as illustrated in FIGS. 2, 6-8. The setup module 20 is an operative device that is communicable with the interactive device 10. The setup module 20 programs the interactive device 10 by inputting parameters into the clock calendar program 12*a*, the daylight savings program 12*b*, and the daily alarm and announcements program 12*c*. In addition, the setup module 20 synchronizes the date 24 and time 26 of multiple interactive devices 10 such that each interactive device 10 may run at exactly the same date 24 and the same time 26. Therefore, the interactive devices 10 will activate any functions 32 stored in the daily alarm and announcements program 12*c* in unison.

Figure 6:
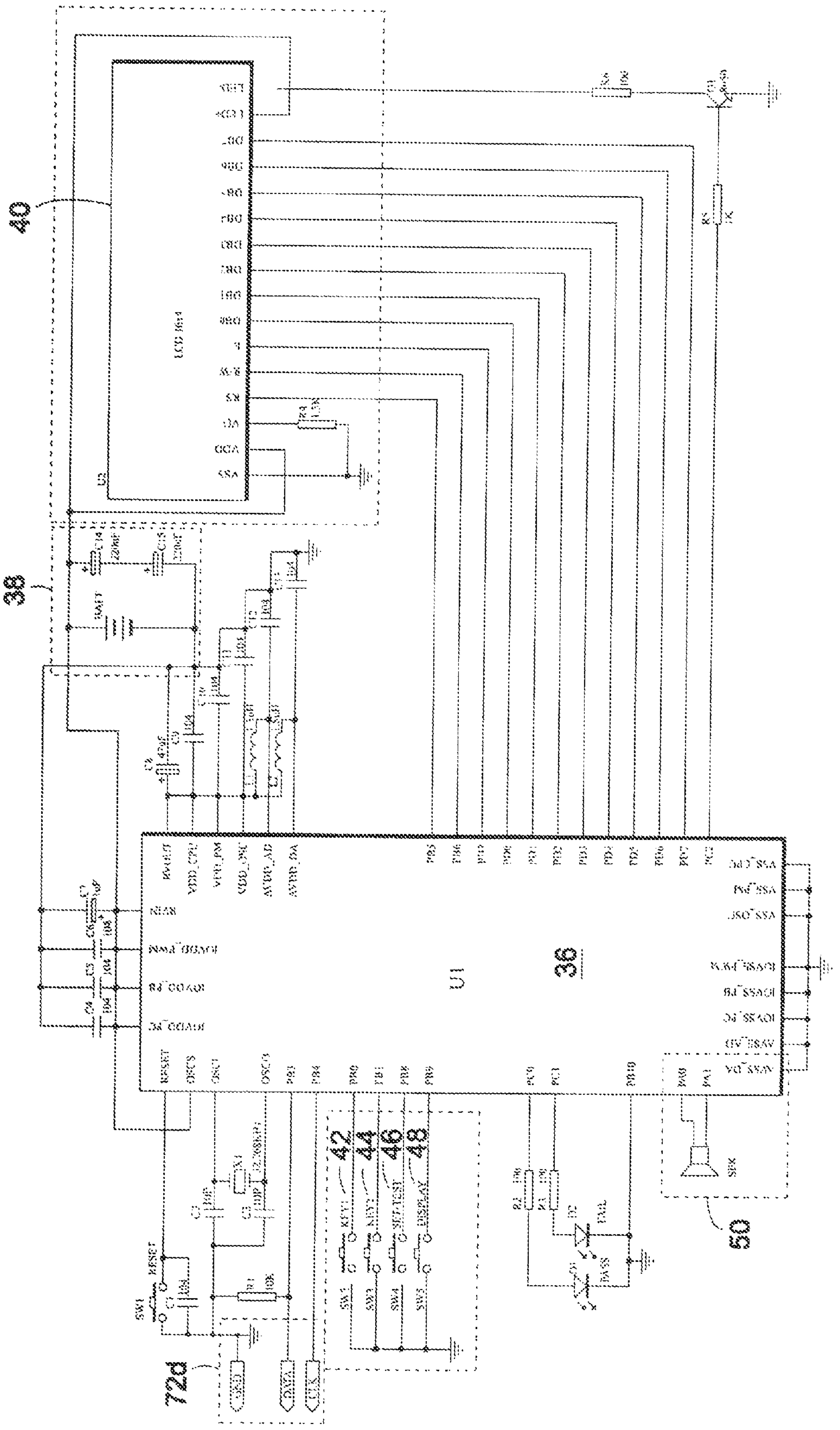
FIG. 6 depicts the electrical schematics of an exemplary setup module which may be used in conjunction with the interactive device of the present invention.

Referring now to FIGS. 2 and 6, the setup module 20 comprises a computer processor 36, an internal battery 38, an electronic display screen 40, a connection means, an input means, and an internal speaker 50. Although the present embodiment employs a setup module 20 that is a hardware component, the functionality of the setup module 20 may also be embodied as software, provided that the device (e.g., a personal computer) running such software is capable of being connected to the interactive device 10 in a manner which will be discussed in more detail below.

Figure 7:
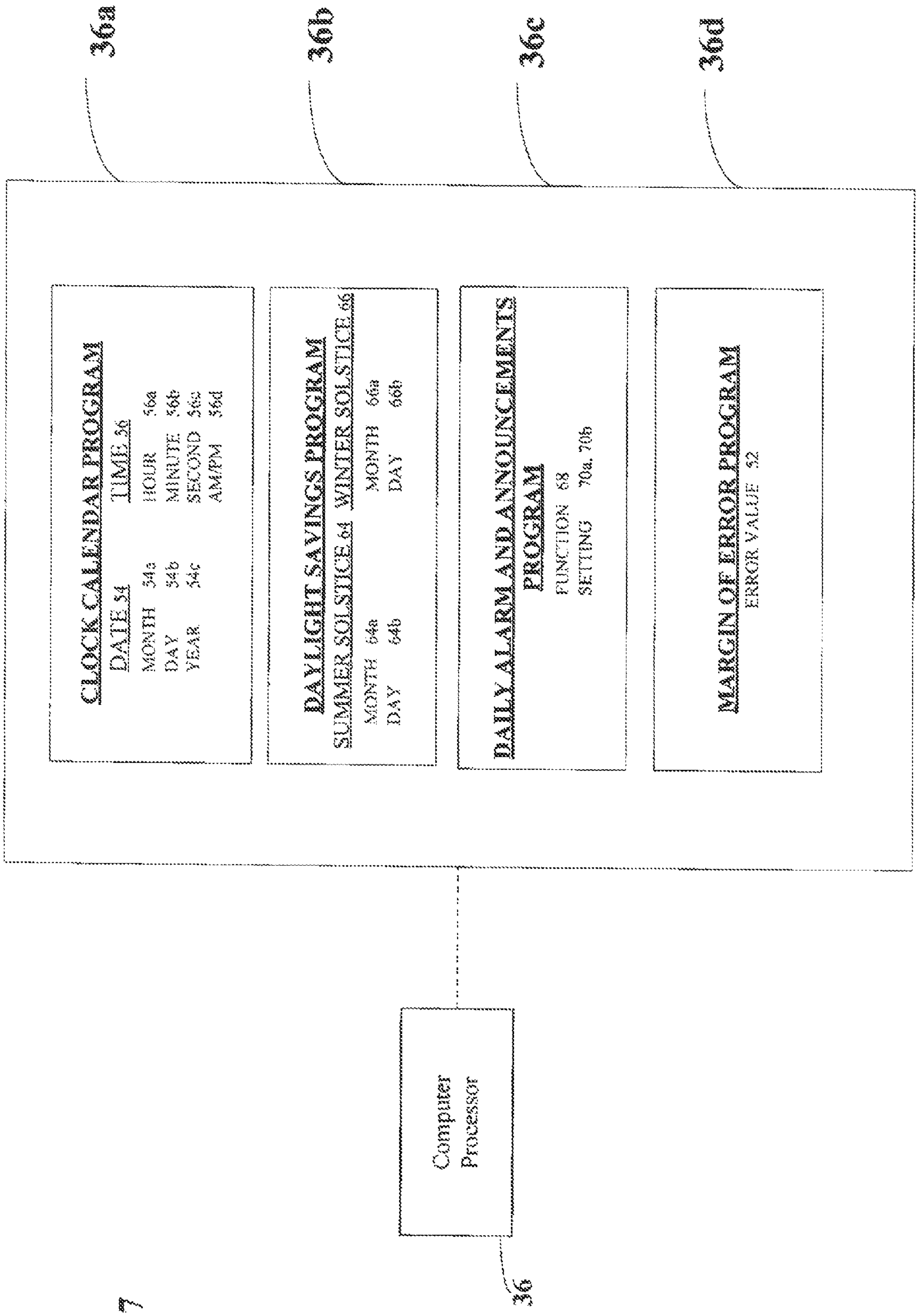
FIG. 7 depicts a software architecture block diagram, representing the data structures of each program run in an embodiment of the setup module.
Figure 8:
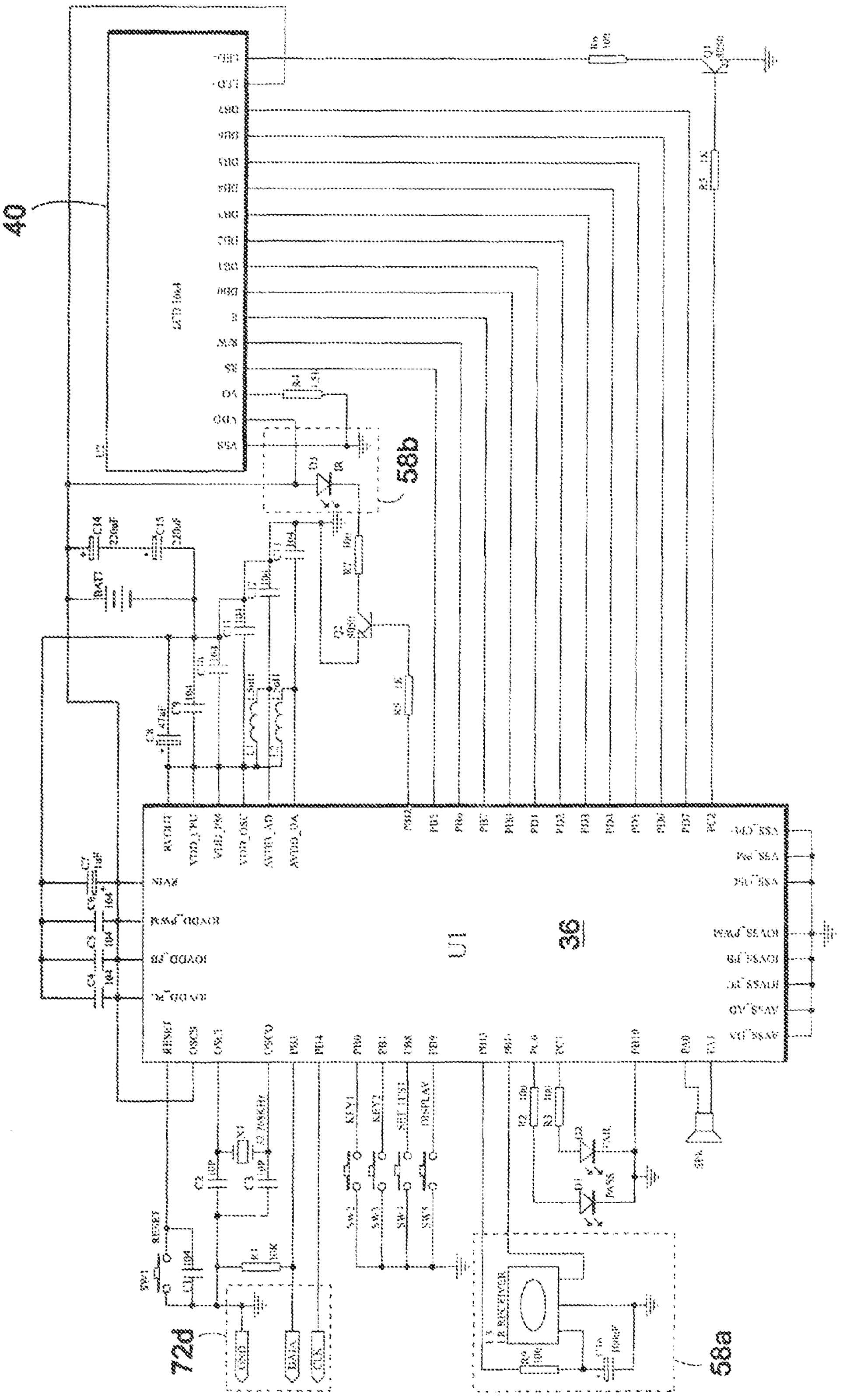
FIG. 8 depicts the electrical schematics of another embodiment of a setup module, wherein the setup module is equipped with an infrared receiver from which to receive data.
Figure 9:
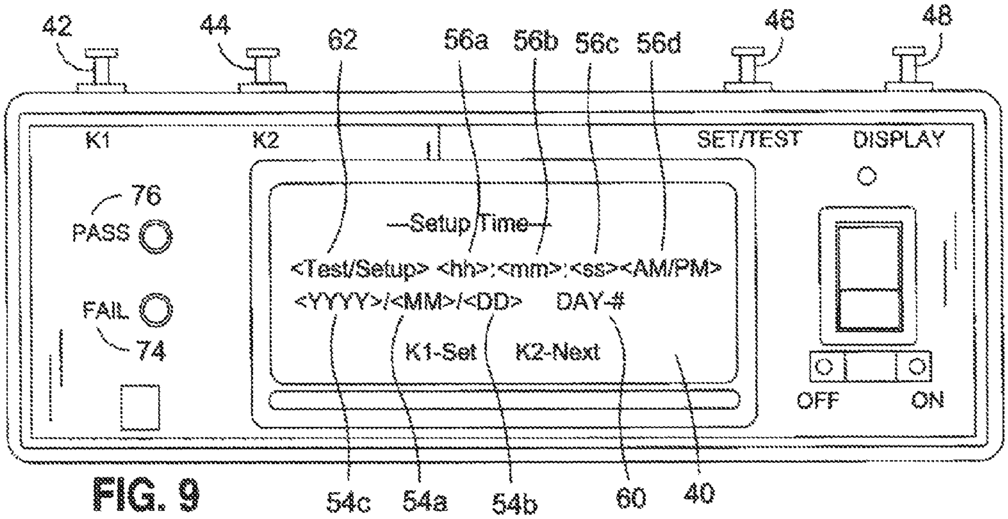
FIG. 9 depicts a screenshot of the setup module, as shown in FIG. 2, while the clock calendar program is in setup mode.

The computer processor 36 runs a series of programs that load the interactive devices 10 with requisite values and parameters. FIG. 7 depicts a software architecture block diagram illustrating the relationship between the setup module's programs. The computer processor 36 runs a clock calendar program 36*a*, a daylight savings program 36*b*, a daily alarm and announcements program 36*c*, and a margin of error program 36*d*. In this regard, the clock calendar program 36*a*, daylight savings program 36*b*, and daily alarm and announcement program 36*c* carry the same logic and data structure as do their counterpart programs 12*a*-12*c* that run in the interactive device 10. The margin of error program 36*d* stores a measurement of time 52 that serves as an acceptable deviation between the time 26 of the interactive device and the time 56 of the setup module. The input means of the setup module 20 may comprise various buttons 42, 44, 46, 48 to input data. The input buttons 42, 44, 46, 48 are disposed upon the setup module. In an exemplary embodiment of the present invention, data may be inputted into the setup module 20 through wireless technology. In this regard, FIG. 8 illustrates the schematics of a setup module 20 configured with an infrared receiver 58*a* as an input means. It is contemplated that a person having ordinary skill in the art would understand that, in this particular embodiment, a user may input data into the setup module 20 by operating a device which has infrared transmission capability. It is also contemplated that in this alternative embodiment, the setup module 20 may be provided with and infrared transmitter 58*b* that allows the setup module 20 to transmit data to an interactive device 10, the combined functionality of the receiver 58*a* and transmitter 58*b* also being in accordance with the teachings of U.S. Pat. No. 7,068,941 mentioned above. Moreover, it is also contemplated that in accordance with a further alternative embodiment of the present invention, the setup module 20 may be outfitted with a transmitter and receiver which allow for the transmission, reception and synchronization of data information through the use of radio frequency (RF) rather than through the use of infrared as occurs through the use of the infrared receiver 58*a* and the infrared transmitter 58*b*.

The setup module 20 has a setup configuration mode and a test configuration mode. The setup configuration mode permits desired values to be entered into the programs 36*a*-36*d*. FIGS. 9-12 illustrate screen shots of the display screen 40 while the setup module 20 is in a setup configuration mode and entering data into each program 36*a*-36*d*. The display button 48 toggles between the displays of different programs. The [K2] button 44 selects a target program 36*a*-36*d*, while the [K1] button 42 is depressed repeatedly until the correct data is displayed on the display screen 40 and then the [K2] button 44 is depressed again for confirmation and input of data into respective programs and fields.

The calendar clock program 36*a* is capable of carrying out the functions of a traditional clock and calendar, in that it may record date 54 and time 56. The values inputted as the date 54 and time 56, will subsequently be the values stored in the interactive device 10 as date 24 and time 26. The date 54 and time 56 fields of the calendar clock program 36*a* of the setup module 20 are displayed upon the display screen 40. The date fields 54 include a year field 54*c* (<YYYY>), a month field 54*a* (<MM>), a day field 54*b* (<DD>), a day/number field 60 (<DAY-#>), a Test/Setup field 62 (<Test/Setup>). The time fields 56 include an hour field 56*a* (<hh>), a minute field 56*b* (<mm>), a second field 56*c* (<ss>), and an AM/PM field 56*d* (<AM/PM>).

Parameters are inputted into a respective field when a cursor is flashing on that particular field. In this regard, in order to program the year field 54*c*, the year field 54*c* must be flashing. The year can be incremented to future years by pushing the [K1] button 42. Upon toggling to a desired year, the manufacturer can store the year by pushing the [K2] button 44. Likewise, in order to input a month value, the month field 54*a* must be flashing. The month field 54*a* can be incremented to future months by pushing the [K1] button 42. Upon reaching a desired month, the manufacturer can store the month by pushing [K2] button 44. For example, if the desired month is March, the manufacturer would push the [K1] button 42 twice, upon doing so, "03" would be flashing in the month field. Subsequently, the manufacturer would push [K2] to set the month as March. In order to input values into the day field 54*b*, the day field 54*b* must be flashing. The day field 54*b* can be incremented by pushing the [K1] button 42. Upon reaching a desired day, the manufacturer can store the day by pushing the [K2] button 44.

The day/number field 60 is populated with the day of the week and the correlated day number of that week. In this regard, table 1 lists the days of the week and the corresponding day number:

TABLE 1

| Day of the week | Day Number |
|---|---|
| Monday | 1 |
| Tuesday | 2 |
| Wednesday | 3 |
| Thursday | 4 |
| Friday | 5 |
| Saturday | 6 |
| Sunday | 7 |

As the month 54*a*, day 54*b*, or year 54*c* fields are adjusted, the corresponding day of the week and day number is displayed in the day/number field 60.

The time fields 56 are set in a similar manner, as are the date fields 54. The time fields 56 include an hour field 56*a*, a minute field 56*b*, a second field 56*c*, and an AM/PM field 56*d*. Each respective field 56*a*-56*d* must be flashing in order to input data. The values may be incremented by pushing the [K1] button 42 and stored in the program by pushing the [K2] button 44. The Test/Setup field 62 is used as a moniker to distinguish whether the setup module 20 is in the setup configuration or the test configuration. In the test configuration, the setup module 20 can test to ensure that the settings of the interactive device 10 are in accordance to those of the setup module 20. The testing configuration's functionality is described in detail below. The user may toggle between the configurations by pushing the [K1] 42 button and subsequently set the configuration by pushing the [K2] 44 button.

Figure 10A:
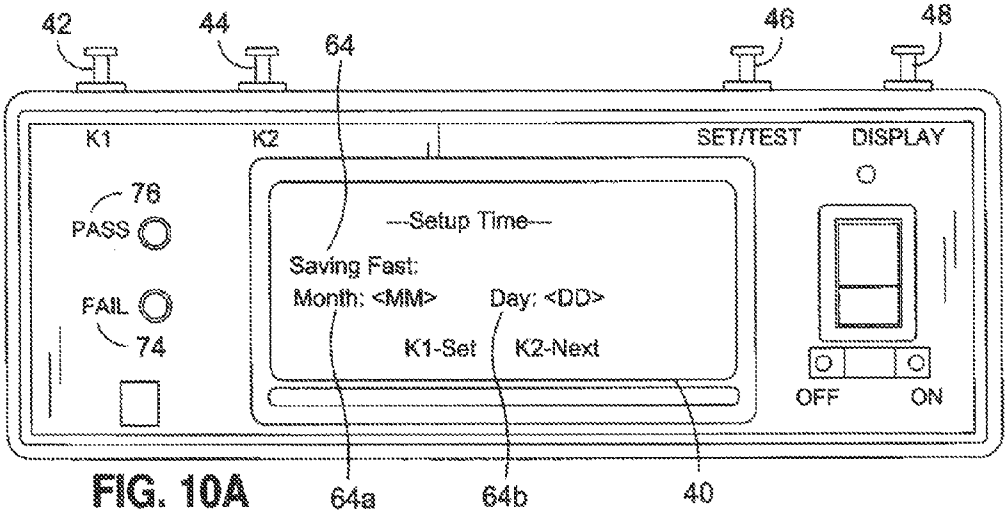
FIG. 10A depicts a screenshot of the setup module, as shown in FIG. 2, while the daylight savings program is in setup mode and the summer solstice date may be inputted.
Figure 10B:
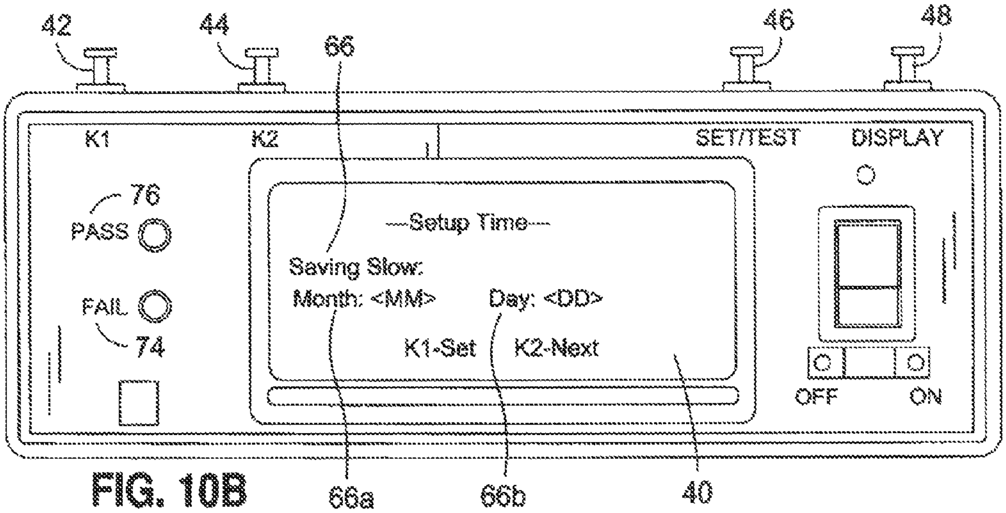
FIG. 10B depicts a screenshot of the setup module, as shown in FIG. 2, while the daylight savings program is in setup mode and the winter solstice date may be inputted.

FIGS. 10A and 10B illustrate screen shots of the display screen 40 while the daylight savings program 36*b* is in setup mode. The setup modes provides for a month field 64*a*, 66*a* and a day field 64*b*, 66*b* in which the user may input the date of the summer solstice and winter solstice. If the interactive device 10 is being shipped to a location that does not acknowledge daylight savings, a "00" may be entered in the month field 64*a*, 66*a* and day field 64*b*, 66*b*. More specifically, FIG. 10A illustrates a screen shot of the display screen 40 depicting the daylight savings program 36*b* receiving data in anticipation of the summer solstice, where time is pushed forward by one hour. The setup module 20 allows the user to enter the date 64 of the summer solstice into the month field 64*a* and day field 64*b*, to trigger the functionality of time being pushed forward by one hour on that day. Manipulating the [K1] 42 and [K2] 44 buttons sets the date 64. In the present embodiment, the displays screen 40 reads "Saving Fast" as indicative of the summer solstice.

FIG. 10B illustrates a screen shot of the display screen 40 depicting the daylight savings program 36*b* receiving data in anticipation of the winter solstice, where time is pushed back by one hour. The setup module 20 allows the user to enter the date 66 of the winter solstice into the month field 66*a* and day field 66*b*. On that particular date 66, the program 36*b* sets the time of the clock calendar program 36*a* one hour backward. The manipulation of the [K1] 42 and [K2] 44 buttons sets the date 66. In the present embodiment, the displays screen 40 reads "Saving Slow" as indicative of the winter solstice. However, it is understood that any moniker may distinctly be representative of the summer and winter solstices.

Figure 11A:
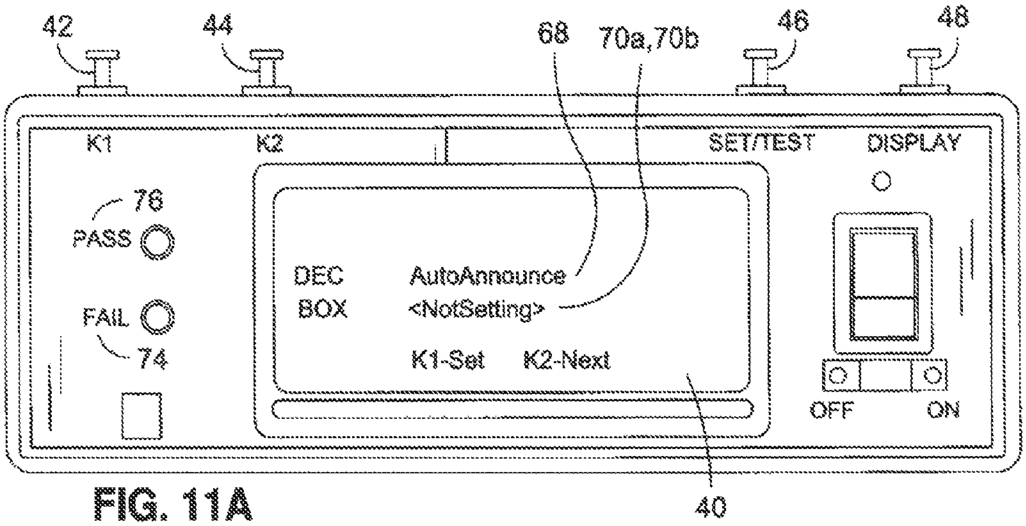
FIG. 11A depicts a screenshot of the setup module, as shown in FIG. 2, while the daily alarm and announcements program is in setup mode and the functionality is disabled.
Figure 11B:
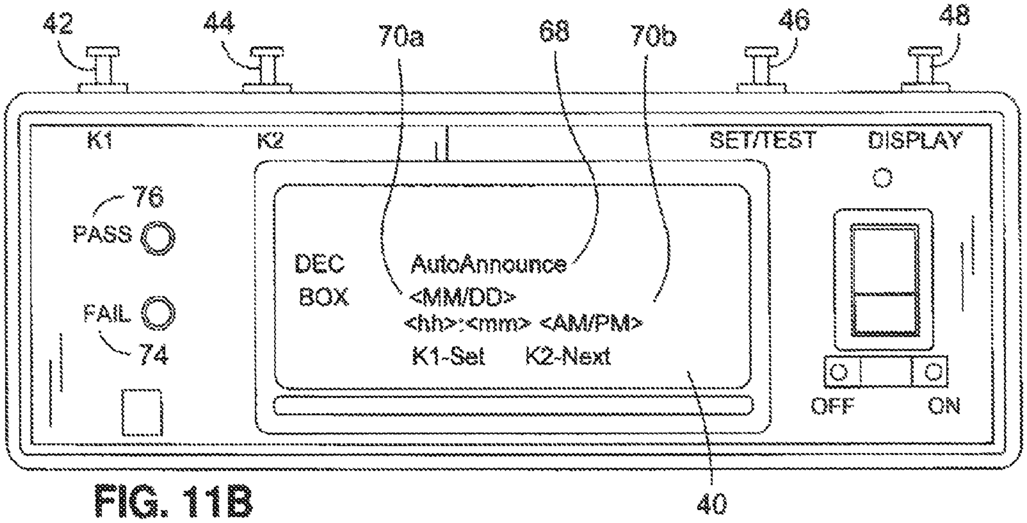
FIG. 11B depicts a screenshot of the setup module, as shown in FIG. 2, while the daily alarm and announcements program is in setup mode and the functionality is enabled and is set according to a setting date.

FIGS. 11A and 11B illustrate screen shots of the display screen 40 while the daily alarm and announcement program 36*c* is in setup mode. The daily alarm and announcement program 36*c* allows a manufacturer to store particular occasions on which to trigger an alarm and announcement. Interactive devices 10 come preprogrammed by the manufacturer with a library or responses that correlate to the stored alarms and are triggered by the program on the appropriate day or in anticipation thereof.

The daily alarm and announcement program 36*c* has a function field 68 and setting fields 70*a*, 70*b*. The function field 68 is representative of a particular response on an occasion. In the present embodiment, the function field 68 is set to "DEC AutoAnnounce", this particular function represents the logic of an Advent calendar like the Advent calendar 1 and automatically generates a December greeting at a prescribed date indicated by setting field 70*a* and a prescribed time indicated by the setting field 70*b*. If the user does not want a particular function to be active in an interactive device, the setting fields 70*a*, 70*b* can be populated with "NotSetting", as illustrated in FIG. 11A. Otherwise, the setting fields 70*a*, 70*b* may be populated with the date and time representative of when the function should be triggered, as illustrated in FIG. 11B. A person having ordinary skill in the art would understand that the daily alarm and announcements 36*c* program may store a multitude of response functions 68 that can be performed on multiple dates 70*a*.

Figure 12:
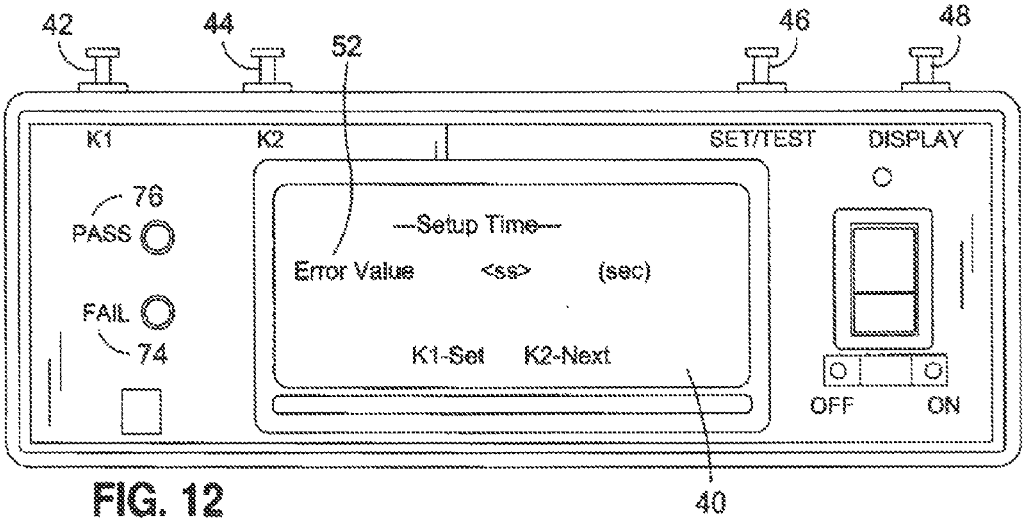
FIG. 12 depicts a screenshot of the setup module, as shown in FIG. 2, while the margin of error program is in setup mode.

FIGS. 12 illustrates a screen shot of the display screen 40 while the margin of error program 36*d* is in a setup configuration. The margin of error program 36*d* has an Error Value field 52. The Error Value field 52 stores a measurement of time that represents an acceptable deviation between the time 56 of the setup module and the time 26 of the interactive devices. Oftentimes it is tedious and difficult to time synchronize devices within fractions of seconds. It is normal practice for a two time synchronized devices to have an acceptable deviation in time. Therefore, manufacturers allot a particular measurement of time that is considered an acceptable deviation. It is generally preferred that the deviation in time be minute such that the consumers will not be cognizant of the time deviation. In the present embodiment, the Error Field 52 is measured by seconds. Therefore, if the Error Value field 52 were set at '2', the setup module 20 would accept a two second deviation between the time 56 set in the setup module and the time 26 set in the interactive device 10.

The setup module 20 programs and time synchronizes an interactive device 10 through a connection. A connection is established via the connection means. FIG. 2 illustrates the setup module 20 as being connected to an interactive device 20 by employing a hard wire or cable 72*a* as the connection means. The cable 72*a* is coupled into a jack 72*b* that is embedded within the interactive device 10 by a three-prong connector 72*c* that is coupled to the distal end of the cable 72*a*. The three prongs of the connector 72*c* correspond to the three outputs collectively labeled with the reference number 72*d* in FIGS. 6 and 8. The jack 72*b* is strategically placed in a discreet manner as to not compromise the aesthetic design of the interactive device 10. As indicated above, FIGS. 5 and 8 illustrate an embodiment of the present invention where the setup module 20 and the interactive device 10 can be communicable via infrared technology 22*a*, 22*b*, 58*a*, 58*b* as an alternative to the use of the cable 72*a*. In this particular variant, it is contemplated that the jack 72*b* may be substituted with an infrared transceiver which may communicate with a corresponding infrared transceiver of the setup module 20. As also indicated above, the functionality of the setup module 20 may also be embodied as software, provided that the device (e.g., a personal computer) running such software is capable of being connected to the jack 72*b* of the interactive device 10. Such connection may be facilitated by cable like the cable 72*a* which has the connector 72*c* at one end thereof and a USB connector connectable to a USB port of the personal computer at the other end thereof. Also, in this particular variant, the jack 72*b* embedded in the interactive device 10 can be substituted or replaced with a USB-port jack for connection with a standard USB-port cable.

An established connection enables the setup module 20 to program and test the interactive device 10. The setup module 20 programs the interactive device 10 by setting the values in the clock calendar program 12*a*, daylight savings program 12*b*, and daily alarm and announcement program 12*c*. The SET/TEST button 46 initiates the data transfer. The setup module 20 also possesses a testing capability by which it ensures that the values stored in the interactive device 10 are in accordance to those set in the setup module 20.

Figure 13A:
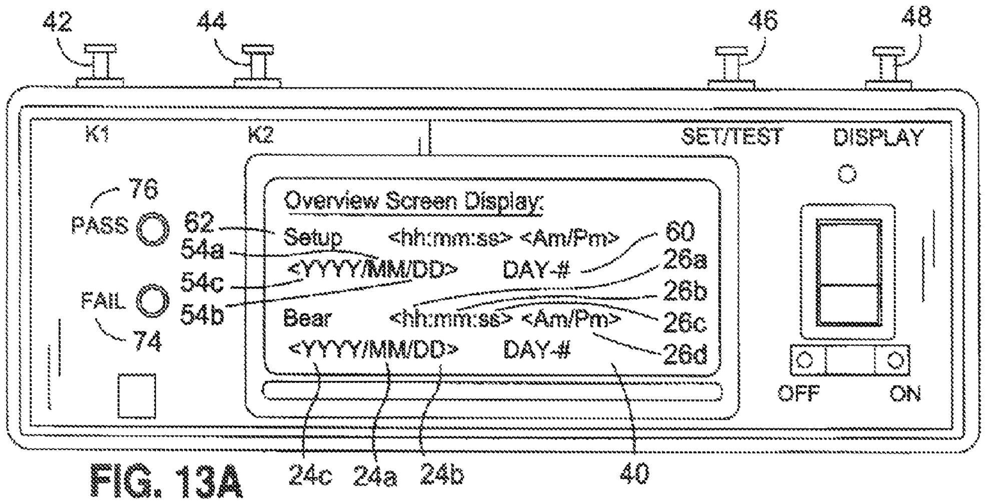
FIG. 13A-13C depict screen shots of the setup module, while the setup module is connected to an interactive device, and the values inputted in each are displayed on the display screen.
Figure 13B:
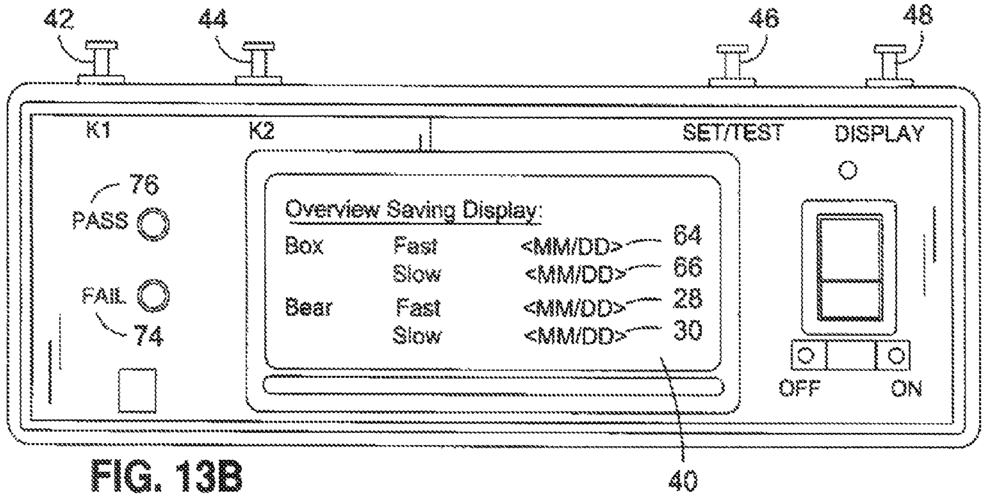
Figure 13C:
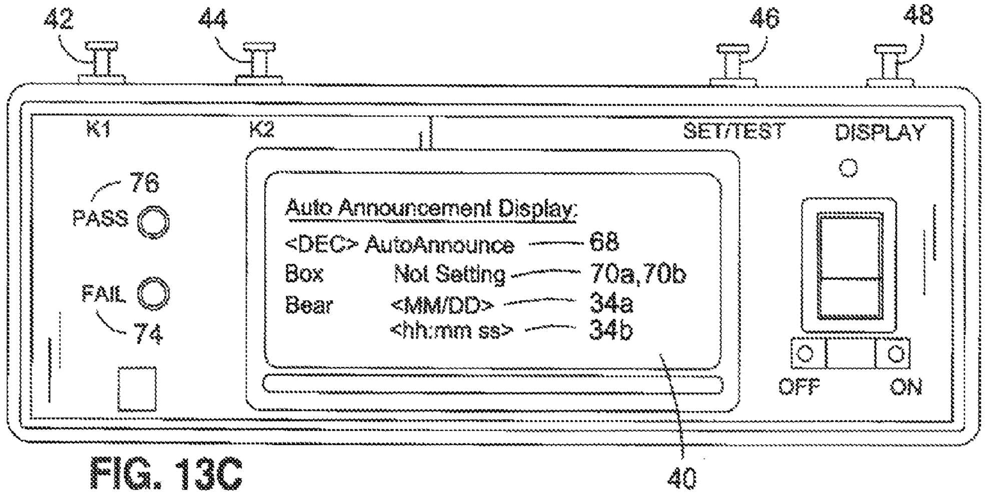

FIGS. 13A-13C depict screen shots of the setup module 20 in a testing configuration. More specifically, the display screen 40 is depicting the values entered in the programs 36*a*-36*c* of the setup module 20 set against the values of programs 12*a*-12*c* of the interactive device 10. The display button 48 toggles between each program. The manufacturer may visually check that each parameter is in accordance with the desired policy, or the manufacturer may trigger the automated testing function of a setup module 20 by pushing the SET/TEST button 46.

Figure 14:
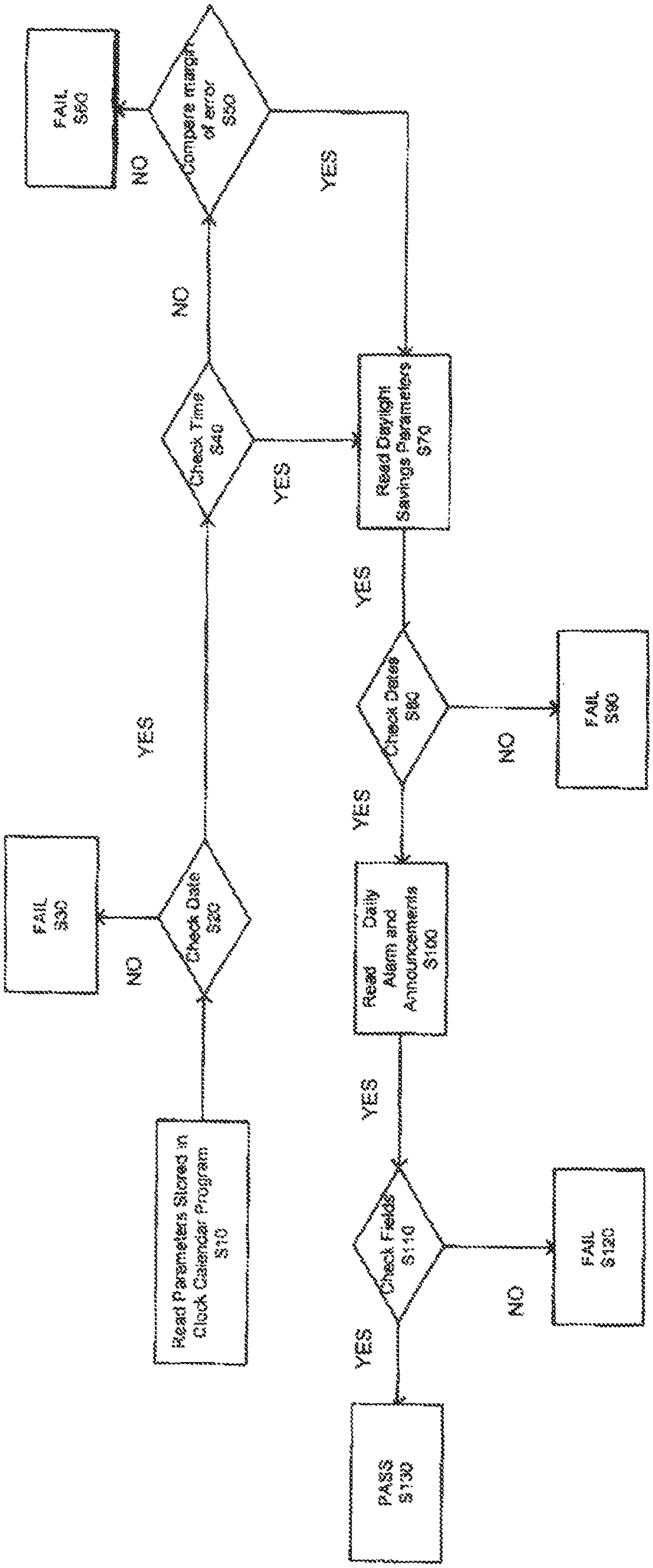
FIG. 14 illustrates a flowchart depicting a series of interactions that occur between an interactive device and a setup module, while the setup module is testing that the values stored in the interactive device are in accordance with the set policy and parameters.

FIG. 14 is a flowchart depicting the testing logic employed by the setup module 20 in an automated testing configuration. At S10, the setup module 20 initially reads the date 24 and time 26 as set in the clock calendar program 12*a* of the interactive device 10. Subsequently at S20, the setup module 20 assess whether the date 24 matches the date field 54 as set in the setup module 20. If the date 24 is not in accordance with setup module 20, the setup module 20 will generate a FAIL message, indicated at step S30. When a FAIL message is triggered, the display screen 40 highlights the incorrect value, and illuminates a red light 74 on the setup module 20. In addition, the setup module 20 generates an audible alarm alerting the manufacturer that a FAIL message has been triggered. If the date 24 is in accordance, the setup module 20 will continue S40 to check the time 26 of the interactive device with the time 56 stored in the setup module 20. If the times 26, 56 are not in accordance, the process continues S50 by deducing the difference in times with the value as set in the margin of error field 52. If the difference in time is not an acceptable deviation as set forth in the setup module 20, a FAIL message will generate, as indicated at S60. If, however, times 26, 56 are in accordance, S50 is skipped, and the process continues with S70.

However, if the deviation in time is acceptable, the process continues S70 by reading the dates 28, 30 set in the daylight savings program 12*b* of the interactive device 10. The process continues S80 by checking the summer and winter solstice dates 28, 30 against the relative dates 64, 66 as set in the setup module 20. In this regard, if the summer and winter solstice dates 28, 30 are not in accordance with those set in the setup module 20, a FAIL message is triggered, as depicted by S90.

If the summer and winter solstice dates 28, 30 are in accordance, the process continues S100 by reading parameters set in the daily alarm and announcements program 12*c* of the interactive device 10. The process continues S110, by the setup module 20 assessing that the function field 32 and setting fields 34*a*, 34*b* (illustrated in FIG. 3) are set in accordance to their relative fields 68, 70*a*, 70*b* as set in the setup module 20. If the values are not in accordance, a FAIL message is triggered, as depicted in S120. If the values are in accordance, a PASS message is generated as depicted in S130. A PASS message indicates that the interactive device 10 has been satisfactorily programmed in accordance to the values set in the setup module 20. When the PASS message is generated, the display screen 40 indicates the test was successful, and a green light 76 is illuminated upon the setup module 20. In addition, the setup module 20 generates an audible alarm alerting the manufacturer that the interactive device 10 has successfully passed the test. After multiple interactive devices 10 are programmed and time/date synchronized through the use of the setup module 20, it is contemplated that some very small, downstream deviation in the time settings of such interactive devices 10 may ultimately occur, such deviation being attributable to the internal clocks of the interactive devices 10 being run at a lower oscillation frequency and a lower power level to maximize the life of the on-board battery.

Figure 15:
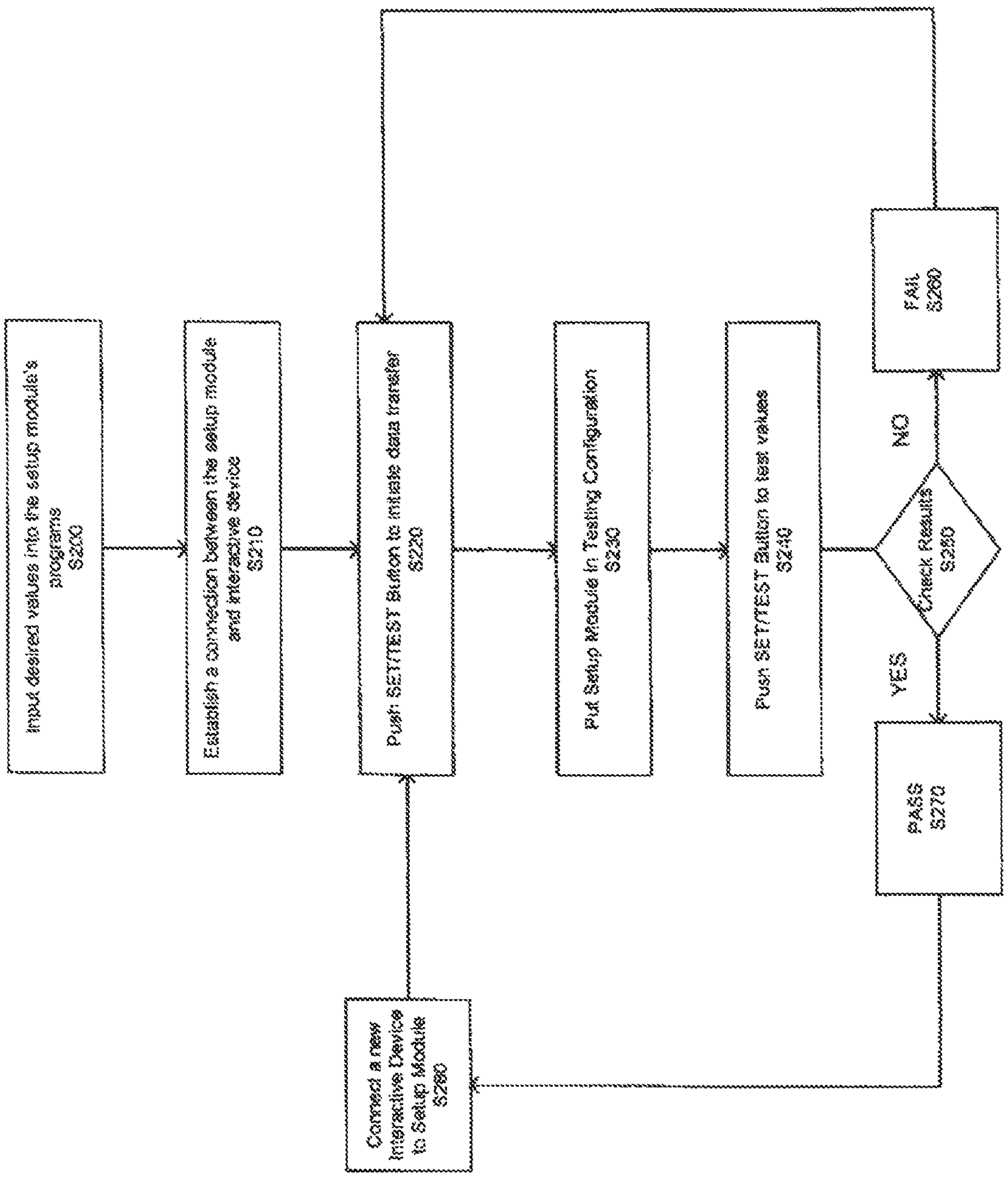
FIG. 15 illustrates a flowchart depicting a sequence of steps that occur for a setup module to time synchronize multiple interactive devices, such that each interactive device is running precisely the same time.

Further in accordance with the present invention, there is also provided a method for time synchronizing an interactive device 10. In this regard, the setup module 20 is capable of time synchronizing multiple interactive devices 10 such that their clock calendar programs 12*a* read the same time 26. FIG. 15 is a flowchart depicting a series of interactions between a setup module 20 and multiple interactive devices 10, such that each interactive device 10 is time synchronized. The method begins at S200 by inputting the requisite parameters into the setup module 20. This includes the obligatory values set in the calendar clock program 36*a*, the daylight savings program 36*b*, the daily alarm and announcements program 36*c*, and the margin of error program 36*d*. The values that are initially programmed into the setup module 20 will be transferred into the programs 12*a*-12*c* of the interactive devices 10. The method continues by establishing a connection S210 between the setup module 20 and a first interactive device 10. Subsequently, the method continues S220 by pushing the SET/TEST button 46 to initiate a data transfer between the setup module 20 and the first interactive device 10.

Upon a successful data transfer, the method continues S230 by utilizing the setup module 20 to test the first interactive device 10, ensuring that the transferred values are in accordance with the values as set in the setup module 20. The method continues at S240 by pushing the SET/TEST button 46 to initiate the testing sequence as described above and illustrated in FIG. 14. The method continues at S250 by checking the results of the testing sequence. If the test was unsuccessful S260, indicating a discrepancy between the data set in the first interactive device 10 and the setup module 20, the method continues by performing steps S220-S240 again. In the alternative S270, a successfully tested first interactive device 10 is now programmed with the parameters stored in the setup module 20. In this regard, the time 26 as set in the calendar clock program 12*a* is precisely the same as the time 56 set in the setup module 20. Therefore, the first interactive device 10 is time synchronized in accordance to the setup module 20.

The method continues at S280 by connecting a second interactive device 10 to the setup module 20 and performing steps S220-S250. Upon a successful data transfer S270 into the second interactive device 10, both first and second interactive devices 10 are time synchronized with respect to each other and the setup module 20.

Figure 16:
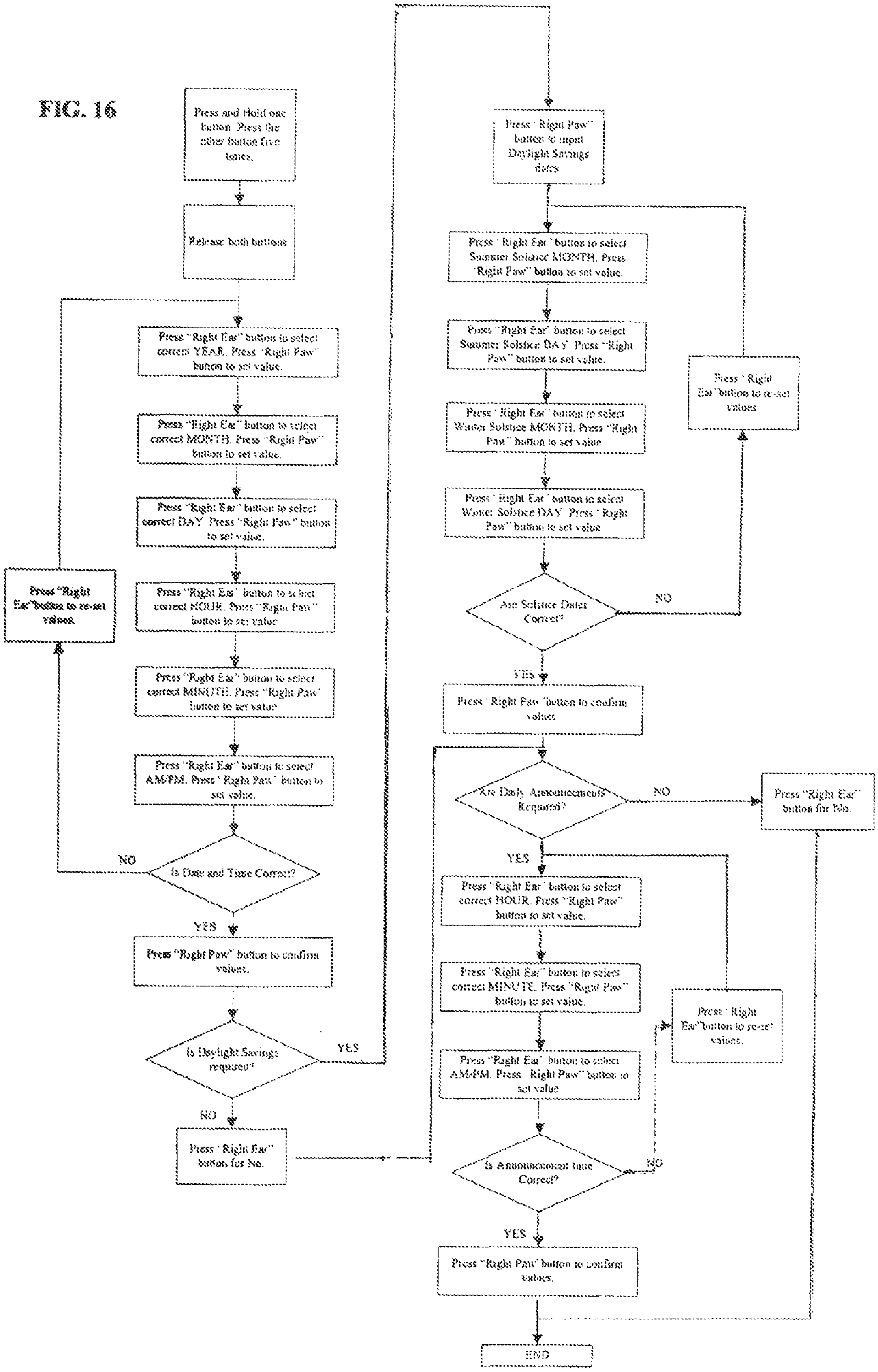
FIG. 16 illustrates a flowchart depicting an exemplary sequence of steps that may be used to facilitate the manual programming of an interactive device by an end user.

As will be recognized by those of ordinary skill in the art, the structural and functional attributes of the interactive device 10 considered in combination with those of the setup module 20 allows a plurality of interactive devices 10 to be programmed (e.g., time synchronized) in a manner which allows such interactive devices 10 to generate a prescribed response at the same time. It is contemplated that the particular time at which the response is generated will correspond to the ultimate shipment destination of the interactive devices 10 which is typically known by the manufacturer at the time and point of origin of manufacture. In view of this functionality, the interactive devices 10 may be more marketable to consumers when viewed upon a retail shelf while generating audio and/or visual messages in concert. Moreover, by time synchronizing the interactive devices 10 in the above-described manner, the ultimate purchaser of each such interactive device 10 may be alleviated from the burden of having to undertake a time consuming, difficult programming task as would otherwise be needed to cause the interactive device 10 to function in the desired manner. Though the time and date data of each interactive device 10 may optionally be "customized" by an end purchaser, the time and date data initially input into the device 10 at the point of origin, which as indicated above is preferably destination specific, does not mandate such customization in order to achieve a requisite level of functionality. This functionality enhances the marketability and appeal of the interactive device 10 since the time and date data is onboard the interactive device 10 while on a store shelf without the need for any retailer or end user involvement. However, in the event such customization is desired, an exemplary protocol which may be implemented by an end user to facilitate the manual programming of an interactive device 10 is shown in the flowchart of FIG. 16.

The particulars shown herein are by way of example and for the purpose of illustrative discussion of the embodiments of the present invention only and are presented in the cause of providing what is believed to be the most useful and readily understood description of the principles and conceptual aspects of the present invention. In this regard, no attempt is made to show any more detail than is necessary for the fundamental understanding of the present invention, the description taken with the drawings making apparent to those skilled in the art how the several forms of the present invention may be embodied in practice.

What is claimed is:

1. An interactive device comprising:

a memory;

a computer processor connected to the memory, the computer processor being operative to execute a clock calendar program, time and date data associated therewith being stored in the memory;

an input device connected to the computer processor, the input device being receptive to a transfer of time and date data of a user selectable and predetermined destination region from a corresponding external clock calendar program; and an output device connected to the computer processor, an output being producible on the output device by the clock calendar program based upon time and date data;

wherein the clock calendar program actively maintains the time and date data of the user selectable and predetermined destination region.

2. The interactive device of claim 1, further comprising another input device including at least two switches which are electrically connected to the computer processor.

3. The interactive device of claim 1, wherein the input device is an infrared receiver.

4. The interactive device of claim 1, wherein the interactive device is a toy having a head and a mouth.

5. The interactive device of claim 4, wherein the interactive device is equipped with at least one motor, a plurality of actuators, and a plurality of switches which are individually and collectively operative to manipulate the head and mouth of the toy in accordance with the software program.

6. The interactive device of claim 1, wherein the computer processor is operative to execute a daylight savings program for adjusting the time to move forward one hour on a summer solstice date and move backward one hour on a winter solstice date.

7. The interactive device of claim 1, wherein the computer processor is operative to execute a daily alarm and announcements program for activating any one of a plurality of stored functions on a corresponding stored setting date at a corresponding stored setting time.

8. The interactive device of claim 7, wherein the daily alarm and announcements program stores the functionality of an Advent calendar.

9. The interactive device of claim 1, wherein the input device comprises at least two input/output ports.

10. The interactive device of claim 1, wherein, the input device is a radio frequency (RF) transceiver.

11. A system for setting up a plurality of interactive devices including a setup module comprising:

a memory;

a computer processor executing a clock calendar program, time and date data of a user selectable and predetermined destination region being actively maintained by the clock calendar program and stored in the memory;

an input device connected to the computer processor, updated time and date data of the user-selectable and predetermined destination region being received through the input device;

a data communications module connected to the computer processor and linkable to at least one of the plurality of interactive devices, the updated time and date data of the user-selectable and predetermined destination region being transmitted to the one of the plurality of interactive devices for storage and maintenance thereon.

12. The system of claim 11, wherein the data communications module is an infrared transmitter electrically connected to the computer processor of the setup module and linkable to a corresponding data communications module of the one of the plurality of interactive devices, the data communications module being an infrared receiver electrically connected to a computer processor of the one of the plurality of interactive devices.

13. The system of claim 11, further comprising another input device including at least two switches which are electrically connected to the computer processor of the setup module.

14. The system of claim 11, further comprising:

an internal sound generating device that generates an audio signal triggered by the computer processor of the setup module.

15. The system of claim 11, wherein the computer processor of the setup module tests the time and date data stored in the one of the plurality of interactive devices, and is operative to generate an output if the time and date data stored in the one of the plurality of interactive devices does not equal the current time and date data stored and actively maintained by the computer processor of the setup module.

16. The system of claim 15, wherein the computer processor executes a margin of error program operative to store an error value field associated with an acceptable deviation of time between the time and date data stored in the memory and the time and date data stored in the one of the plurality of interactive devices.

17. The system of claim 16, wherein the computer processor of the setup module is configured to generate an output if the deviation between the time and date data stored in the memory and the time and date data stored in the one of the plurality of the interactive devices is greater than the error value field.

18. The system of claim 11, wherein the input device comprises at least two input/output ports.

19. The system of claim 11, wherein the input device is a radio frequency (RF) transceiver.

20. The system of claim 11, further comprising another input device including at least two switches which are electrically connected to the computer processor.

21. The system of claim 11, wherein the input device is an infrared receiver.

22. An interactive device comprising:

a memory;

a computer processor connected to the memory and operative to execute a clock program, time data associated therewith being stored in the memory;

an input device connected to the computer processor, the input device being receptive to a transfer of current time data of a user selectable and predetermined destination region from a corresponding external clock program; and an output device connected to the computer processor, an output being producible on the output device by the clock program based upon the time data;

wherein the clock program actively maintains the time data of the user selectable and predetermined destination region.

23. An interactive device comprising:

a memory;

a computer processor connected to the memory and operative to execute a clock program, time data associated therewith being stored in the memory;

an input device connected to the computer processor, the input device being receptive to a transfer of current time data of a user selectable and predetermined destination region from a corresponding external clock program; and an output device connected to the computer processor, an output being producible on the output device by the clock program based upon time and date data of the user selectable and predetermined destination region;

wherein the clock program actively maintains the time data of the user selectable and predetermined destination region.

* * * * *